United States Patent
Kolych et al.

(10) Patent No.: US 12,213,044 B2
(45) Date of Patent: Jan. 28, 2025

(54) METHODS, DEVICES AND SYSTEMS FOR ESTIMATING DISTANCE WITH TRANSMITTED FREQUENCY SETS

(71) Applicant: Cypress Semiconductor Corporation, San Jose, CA (US)

(72) Inventors: Igor Kolych, Lviv (UA); Igor Kravets, Lviv (UA); Kiran Uln, Pleasanton, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 440 days.

(21) Appl. No.: 17/554,708

(22) Filed: Dec. 17, 2021

(65) Prior Publication Data

US 2023/0199456 A1   Jun. 22, 2023

(51) Int. Cl.
   H04W 4/80   (2018.01)
   H04W 4/02   (2018.01)

(52) U.S. Cl.
   CPC ............. *H04W 4/80* (2018.02); *H04W 4/023* (2013.01)

(58) Field of Classification Search
   CPC ................... H04W 4/80; H04W 4/023; H04B 2201/71634
   See application file for complete search history.

(56) References Cited

U.S. PATENT DOCUMENTS

| | | | | |
|---|---|---|---|---|
| 2001/0028678 A1* | 10/2001 | Kato | ........................ | H04L 5/006 |
| | | | | 375/222 |
| 2007/0024487 A1* | 2/2007 | Zemany | .................. | G01S 13/38 |
| | | | | 342/28 |
| 2007/0111692 A1* | 5/2007 | Kuramoto | ............ | H04B 7/0814 |
| | | | | 455/277.1 |
| 2009/0243932 A1* | 10/2009 | Moshfeghi | ............. | G01C 21/20 |
| | | | | 342/378 |
| 2013/0310074 A1* | 11/2013 | Porzio | ..................... | G01S 11/02 |
| | | | | 455/456.1 |
| 2019/0187262 A1* | 6/2019 | Moe | ....................... | G01S 13/825 |
| 2019/0222406 A1* | 7/2019 | Wang | .................. | H04L 25/0224 |
| 2020/0264257 A1* | 8/2020 | Stitt | .......................... | G01S 3/50 |
| 2022/0050162 A1* | 2/2022 | Zand | ..................... | H04W 4/026 |
| 2022/0329968 A1* | 10/2022 | Raj | ........................ | H04W 4/80 |

OTHER PUBLICATIONS

E. Lee, "High Accuracy Distance Measurement for Bluetooth Based on Phase Ranging", Session : De-facto Standard Development Organization #3, 24 pgs. (May 24, 2019).

* cited by examiner

*Primary Examiner* — Wen W Huang

(57) ABSTRACT

A method can include determining a plurality of sample sets, each sample set being different from one another and including a plurality of frequencies separated by a uniform frequency range; wirelessly transmitting information identifying the sample sets for at least one remote device; for each sample set, transmitting a tone on each frequency of the sample set, receiving a tone on each frequency of the sample set from another device, and determining phase difference values for the received tones with respect to corresponding transmitted tones. From the phase shift values, a distance to the other device can be estimated. Corresponding devices and systems are also disclosed.

20 Claims, 19 Drawing Sheets

(BACKGROUND)

METHODS, DEVICES AND SYSTEMS FOR ESTIMATING DISTANCE WITH TRANSMITTED FREQUENCY SETS

TECHNICAL FIELD

The present disclosure relates generally to distance estimation and localization using transmitted wireless signals, and more particularly to systems that use phase estimation to estimate distance.

BACKGROUND

Wireless device applications, such as those operating according to the Bluetooth (BT) Low Energy (BLE) Standard, can involve device identification, secure communication between devices, and localization. As but two of many possible examples, passive key entry and a tire pressure monitoring system (TPMS) can require all or some of these capabilities. The BLE specification defines various methods for performing localization functions. Such methods include signal level estimation (received signal strength indication, RSSI), angle of arrival (AoA), high accuracy distance measurement (HADM) round trip time (time of flight, ToF), and HADM phase based ranging (PBR).

HADM PBR estimates a distance between two BLE devices by measuring phase differences of "reflected" (i.e., returned) signals in different frequencies. However, the number and characteristics of these frequencies are limited by the duration of the communication event, the BT bandwidth, frequency resolution and changing environment. Also, there can be different parasitic effects that can decrease accuracy, such as external noise, drift of oscillators, temperature influence on analog components, multipath effects, effects from the motion of located object, and others.

FIG. 15 is a diagram showing an example of a system 1501 executing a BLE PBR operation. An initiator device 1503 can transmit at a first frequency $\omega_1$. A reflector device 1505 can receive the transmission $\omega_1$ and can measure its phase. A reflector device 1505 can then transmit an unmodulated tone to the initiator device 1503 at a measured phase and the same frequency $\omega_1$. Initiator device 1503 can determine a phase difference ($\Delta\varphi$) for the received transmission with respect to its own running oscillator. System 1501 jumps to a next frequency $\omega_2$ according to the established BLE special interest group (SIG) or proprietary procedure, and the process can repeat.

Referring still to FIG. 15, a travelling time from initiator to a reflector and back again ($\tau^{I \to R \to I}$) can be essentially equal to a (d/2c), where d is the distance between the two devices and c is the speed of light. Traveling time can be shown to be equal to ($\Delta\varphi/\Delta\omega$), where $\Delta\varphi$ is a difference in phase and $\Delta\omega$ is a difference in frequency.

Ranging using transmitted signals is known in the different field of frequency modulated continuous wave (FMCW) radar applications, including the selection of optimal frequencies for ranging. FMCW radar systems typically operate according to two rules: accuracy of distance estimation is defined by frequency bandwidth (BW); and range of detection is defined by frequency resolution. However, such approaches are unsuitable in BLE HADM PBR applications due to the different operating principles, the limited time of communication event (assumption of small relative distance change between BLE devices), and various parasitic effects already noted. Also, FMCW radar ranging systems optimize for one ranging method, while distance estimation for BLE HADM includes two different complementary approaches (PBR and RTT). Still further, applications such as BLE HADM can have security requirements (such as some randomness/pseudo-randomness) in frequency selection, which is not present in conventional FMCW radar applications.

It would be desirable to arrive at some way of range finding that is suitable for wireless systems with limited event times, and yet provide improved performance over conventional approaches.

SUMMARY

Embodiments can include a method for estimating a distance between two devices that includes: determining an operating range comprising a plurality of consecutive transmission frequencies; determining a plurality of sample sets, each sample set being different from one another and including a plurality of frequencies separated by a uniform frequency range; wirelessly transmitting information identifying the sample sets for at least one remote device. A method can further include, for each sample set, transmitting a tone on each frequency of the sample set, receiving a tone on each frequency of the sample set from another device, determining local phase shift values for the received tones with respect to corresponding transmitted tones. A distance estimation value for a distance to the other device can be generated with at least the local phase shift values and the remote phase shift values.

DETAILED DESCRIPTION

Figure 1:
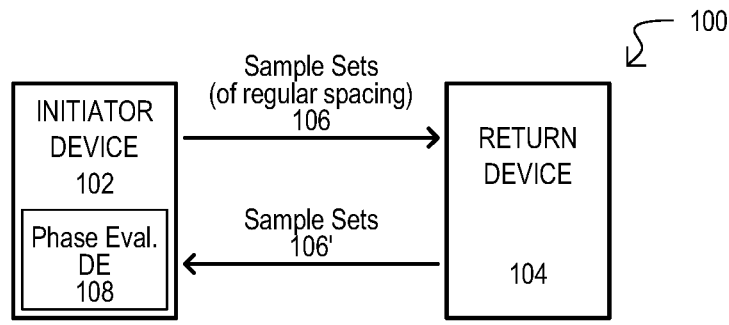
FIG. 1 is a block diagram of a system according to an embodiment.

According to embodiments, in a distance estimation operation, tones can be transmitted for sample sets, where the sample sets include tones spaced at regular intervals (i.e., spaced apart by a same frequency range). Sample sets can be selected and/or adjusted between measurement operations (e.g., events). Tones of a sample sets can be selected from an operating bandwidth of a system. An operating BW can be a range of frequencies to which transmission are limited (e.g., Bluetooth frequency, IEEE 802.11 wireless channel, etc.). Phase differences for such sample sets can be measured and used to estimate a distance between two devices.

In some embodiments, one or more sample sets can be selected to make optimal use of the operating BW, with tones of the sample set spanning no less than 80% of the operating BW.

In some embodiments, tones of each sample set can be transmitted individually, according to a sequence.

In some embodiments, one or more tones of a sample set can be transmitted simultaneously.

In some embodiments, a system can randomly switch between sample sets between different distance estimation operations (e.g., events).

In some embodiments, a sample set can have tones separated by a first frequency difference ($\Delta f_1$), with a next sample set having tones separated by a second frequency difference ($\Delta f_2$). A value $\Delta f_1$ can be a multiple of two of $\Delta f_2$, or vice versa.

In some embodiments, a system can be compatible with a Bluetooth (BT) standard, including the Bluetooth Low Energy (BLE) standard, and sample sets can have tones separated by any of 11 MHZ, 10 MHZ, 9 MHz, 8 MHZ, 5 MHz or 4 MHz.

In some embodiments, a system can be compatible with one or more IEEE 802.11 wireless standards, and sample sets can subcarriers contained within a long training field (LTF) of a transmitted packet.

In some embodiments, distance estimation can be combined with other location algorithms to arrive and distance and direction values for locating one device with respect to the other device.

In the various embodiments below, like items are referred to by the same reference characters, but with the leading digit(s) corresponding to the figure number. Unless noted otherwise, as used herein, the term Bluetooth (BT) is understood to include BLE.

FIG. 1 is a block diagram of a system 100 according to an embodiment. A system 100 can include an initiator device 102 and a return (reflector) device 104. An initiator device 102 can estimate a distance to return device 104 based on phase difference measurements of signals transmitted between the two devices. An initiator device 102 can transmit sample sets 106 of signals, where each sample set includes a number of tones separated from one another by a same frequency step (i.e., have a regular spacing). Return device 104 can transmit the same sample sets 106' in a phase that was measured for the sample set 106 received from the initiator device 102. From phase differences for sample set 106 and sample set 106', initiator device 102 can estimate a distance 108 to return device 104.

A system 100 can provide accurate range finding with sample sets that span an available operating bandwidth. Further, fast distance estimation algorithms can be employed with such sample sets.

Figure 2:
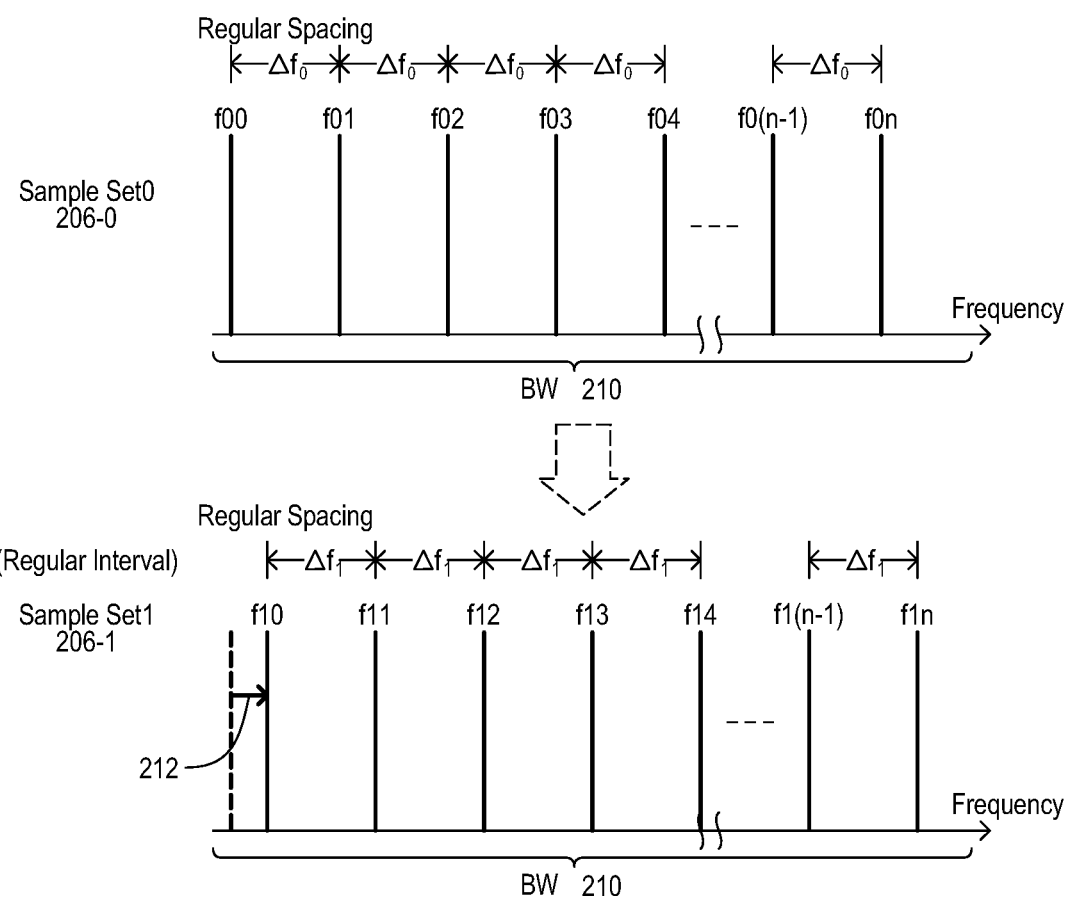
FIG. 2 is a diagram showing frequencies of sample sets used in a distance estimation operation according to embodiments.

FIG. 2 is a diagram showing two sample sets (206-0 and 206-1) according to embodiments. A sample set 206-0 can include a number (n+1) of tones on frequencies f00 to f0n. Frequencies (f00 to f0n) can be separated from one another by a same frequency step or range ($\Delta f_0$). Sample set 206-0 can be arranged to cover a large portion of an operating bandwidth 210. An operating bandwidth 210 can be a range of frequencies to which transmissions are restricted according to a standard or protocol. A frequency step ($\Delta f_0$) is understood to be more than one available frequency in the operating bandwidth.

Like sample set 206-0, a sample set 206-1 can include a number (n+1) of tones on frequencies f10 to f0n. However, sample set 206-1 is different from sample set 206-0. Tones of sample set 206-1 can be separated by a frequency step ($\Delta f_1$), which can be the same as, or different than, frequency step ($\Delta f_0$) of sample set 206-0. A sample set 206-1 can be offset from another sample set by an offset amount 212.

An operating bandwidth 210 can be a bandwidth according to any suitable standard or protocol. In some embodiments, an operating bandwidth 210 can be a BT bandwidth (i.e., from 2.402 GHz to 2.480 GHZ). In some BT embodiments, tones of sample sets can be unmodulated signals (which can be similar to continuous tone extensions) without BT packets. In some BT embodiments, tones of sample sets can be generated with continuous tone extensions (CTEs) included with BT packets. In some BT compatible embodiments, packets can be BLE packets transmitted on 2 MHz BLE channels. However, in other embodiments, such packets can be BT packets transmitted on 1 MHz BT channels. In some embodiments, an operating bandwidth 210 can be a channel according to an IEEE 802.11 wireless standard (e.g., a 20 MHz, 40 MHZ, 80 MHz or 160 MHz channel). In some IEEE 802.11 compatible embodiments, tones of a sample set can be subcarriers transmitted simultaneously in a long training field (LTF) of a packet.

Figure 3A:
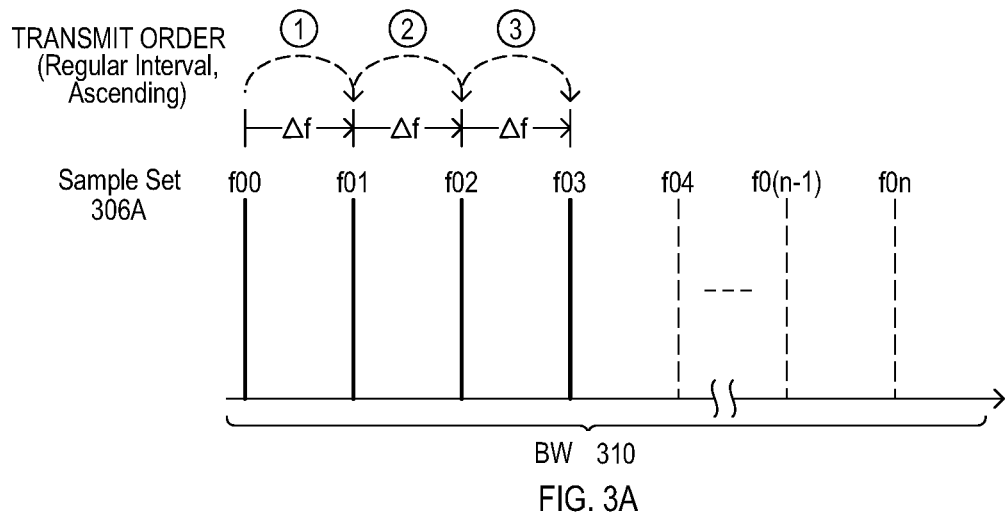
FIGS. 3A to 3C are diagrams showing the sequential selection of frequencies of sample sets used in a distance estimation operation according to various embodiments.
Figure 3B:
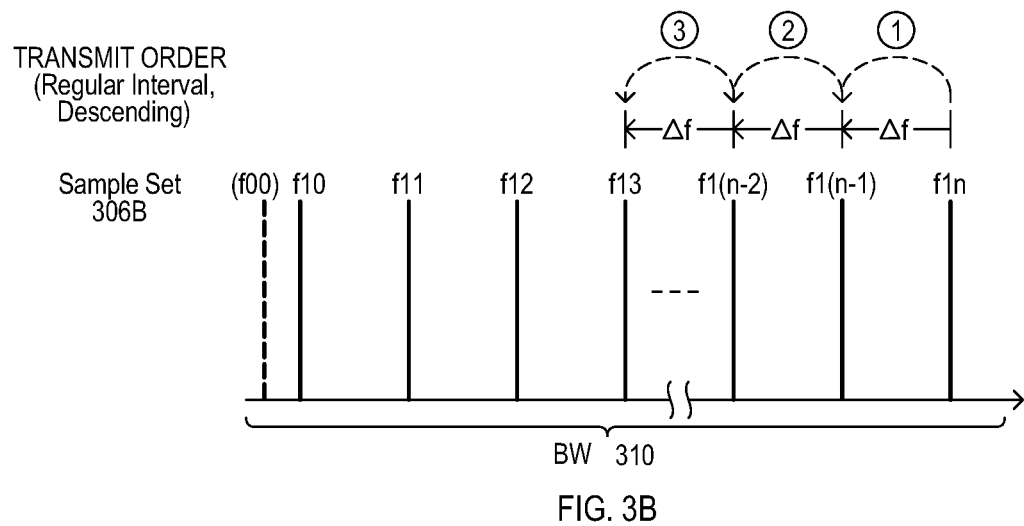
Figure 3C:
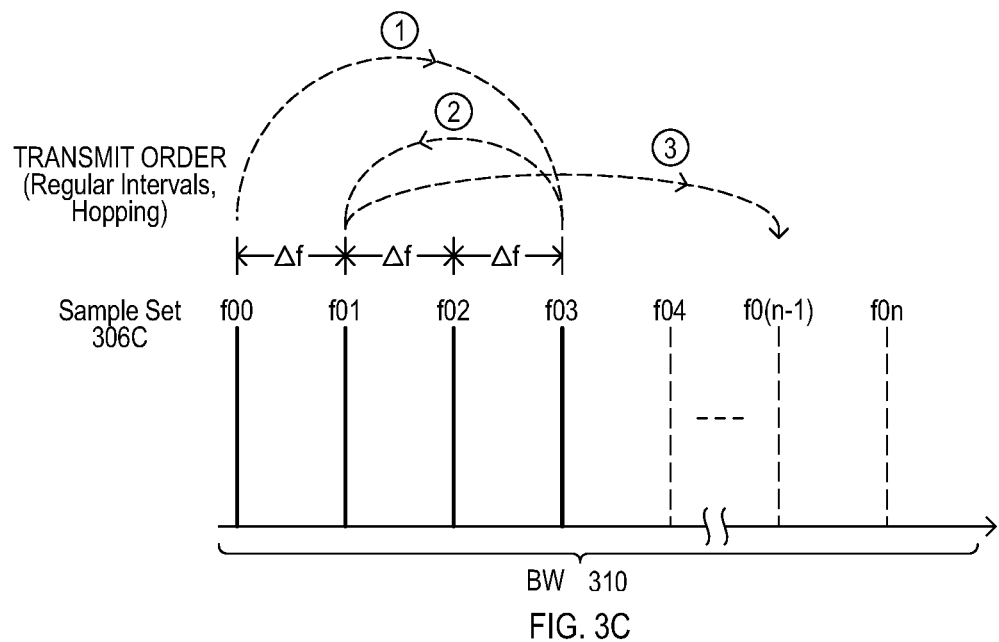

In some embodiments, tones of a sample set can be transmitted individually according to a predetermined order. FIGS. 3A to 3C are diagrams showing sample sets according to various embodiments. FIG. 3A shows a sample set 306A that is transmitted in an ascending order with respect to frequency. A tone can be transmitted at frequency f00, followed by another at f01, etc. Each tone in the sample set being separated from the previous one by a same amount $\Delta f$.

FIG. 3B shows a sample set 306B that is transmitted in a descending order with respect to frequency. A tone can be transmitted at frequency fn, followed by another at f(n−1), etc. Each tone in the sample set being separated from the previous one by a same amount $\Delta f$.

FIG. 3C shows a sample set 306C that hops between different tones. As but one example, such hopping can be in a random or pseudo-random order. Such a hopping can occur across frequencies of the sample set (which are separated at the uniform spacing $\Delta f$).

In the embodiments of FIGS. 3A to 3C, tones of the sample sets (306) can be restricted to an operating bandwidth 310. In some embodiments, sample set tones can be selected to maximize an operating bandwidth. It is understood that a first tone of a sample set can begin at any frequency of the sample set, and samples sets that ascend or descend can "wrap" once a last or first tone of sequence has been reached. Sample sets that include hopping, can eliminate a frequency from selection after it has been used, or can remain random, allowing for a same frequency to be randomly repeated.

Figure 4:
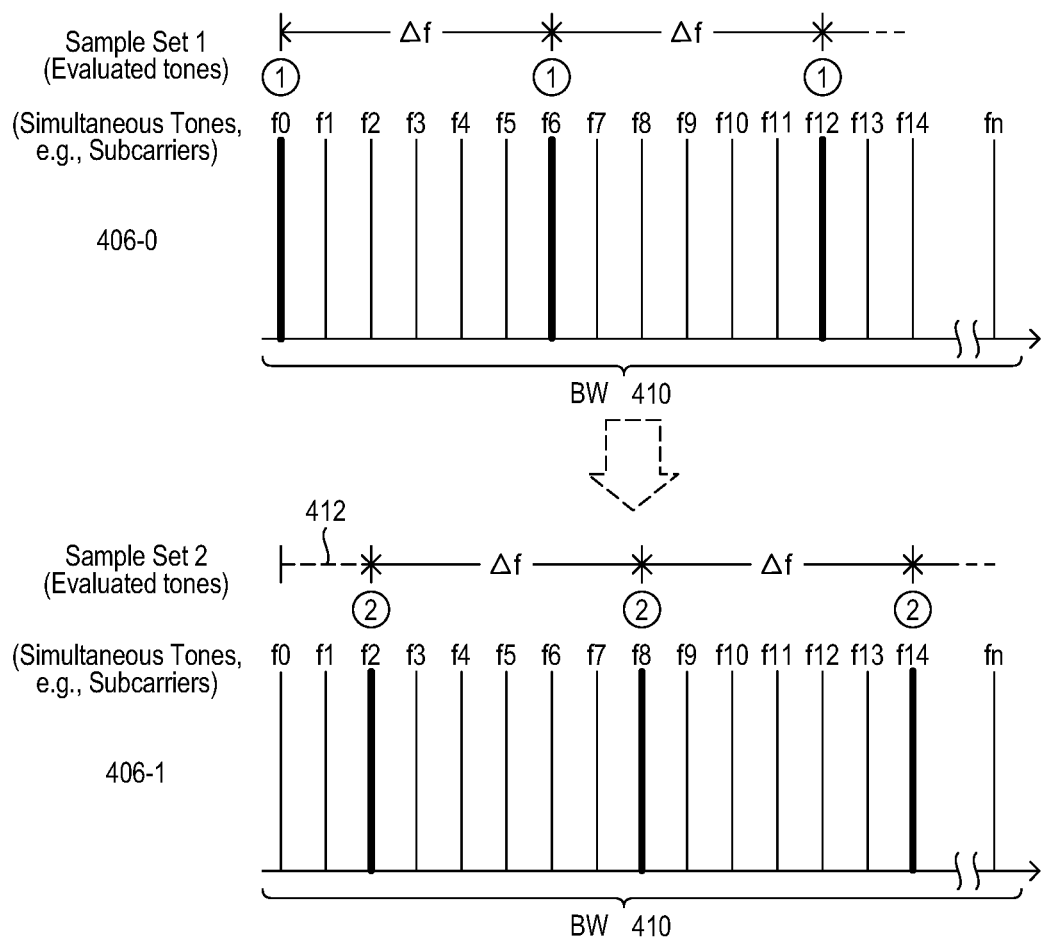
FIG. 4 includes diagrams showing the simultaneous transmission of sample set tones according to embodiments.

In some embodiments, all, or a portion of the tones of a sample set can be transmitted simultaneously. FIG. 4 includes diagrams showing two sample sets according to embodiments. FIG. 4 shows a sample set 406-0 that is transmitted as part of a multi-frequency transmission. In the transmission event, tones can be transmitted on n+1 frequencies. A subset of the transmitted frequencies can form the sample set. Tones of the sample set 406-0 can separated from one another by a uniform frequency range ($\Delta f$).

FIG. 4 shows a second sample set 406-1 that can be used in a distance estimation operation following the sample set 406-0. In the embodiment shown, sample 406-1 is formed by tones of the sample set (f2, f8, f14) transmitted simultaneously in the group of frequencies (f0 to fn) and shifted by an amount 412. While sample set 406-1 has a same separation between tones ($\Delta f$) as sample set 406-0, alternate embodiments can have a different uniform separate amount. As in the case of other embodiment herein, frequencies of a sample set can be selected to maximize use of the available bandwidth 410. Further, a number of tones of a sample set can be maximized based on the processing capability of the devices. Also, the finite time of tone duration can impact number of tones (subcarriers) that can be correctly extracted from a transmitted signal.

Figure 5A:
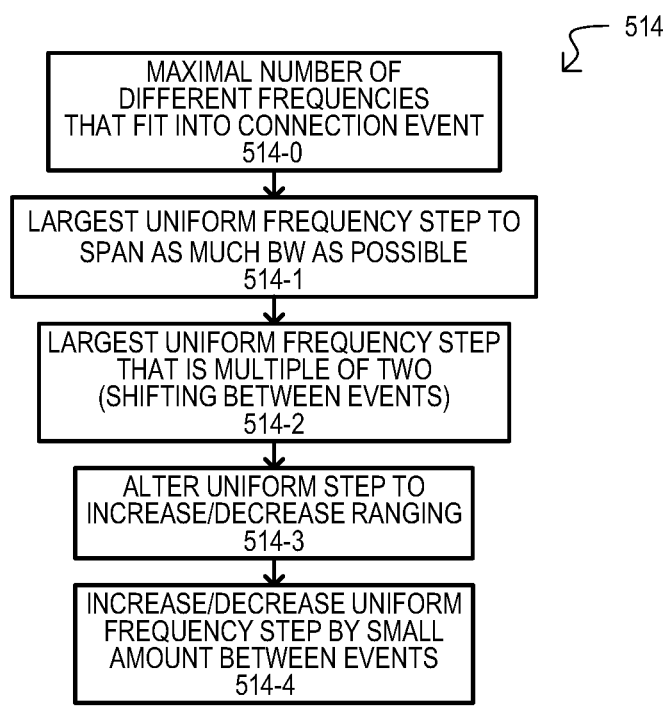
FIG. 5A is a diagram showing factors for selecting frequencies for sample sets according to embodiments.

According to embodiments, frequencies for sample sets can be selected based on one or more factors. A set of selection factors 514 according to an embodiment is shown in FIG. 5A.

Frequencies can be selected to maximize the number of frequencies that fit into a connection event 514-0. A connection event can represent a time limitation constraint. Such a time limitation constraint can arise from the operating environment and/or systems, and can arise from factors including but not limited to: an operating standard (e.g., Bluetooth connection interval); a processing capability (e.g., how many phase difference calculations can be completed); the finite time of transmitted signal (e.g., the number of tones that can be extracted by an inverse fast fourier transform for IEEE 802.11 compatible embodiments); or speed of an object to be located (e.g., faster objects may need shorter event times). In embodiments that operate by the sequential generation of tones, a connection event can dictate the number of tones that are possible in the event.

Frequencies can be selected to provide a largest frequency step to span as much bandwidth as possible 514-1. Such a feature can provide increased accuracy over smaller frequency steps. In some embodiments, at least one sample set can represent a maximum use of bandwidth.

Frequency steps between sample tones can be selected to be a multiple of two 514-2. This can enable a uniform frequency step between sample sets, by shifting sample sets with respect to one another. Such a feature can also increase ranging and/or enable faster processing of distance estimation values.

Frequency steps for a sample set can be changed between events to increase or decrease ranging 514-3. In some embodiments, such changing of frequency step can be dynamic or static.

Frequency steps between different events (or sample sets) can be increased or decreased by a small amount 514-4. In some embodiments this can include single frequency changes and/or a minimal change in frequency according to a standard.

Figure 5B:
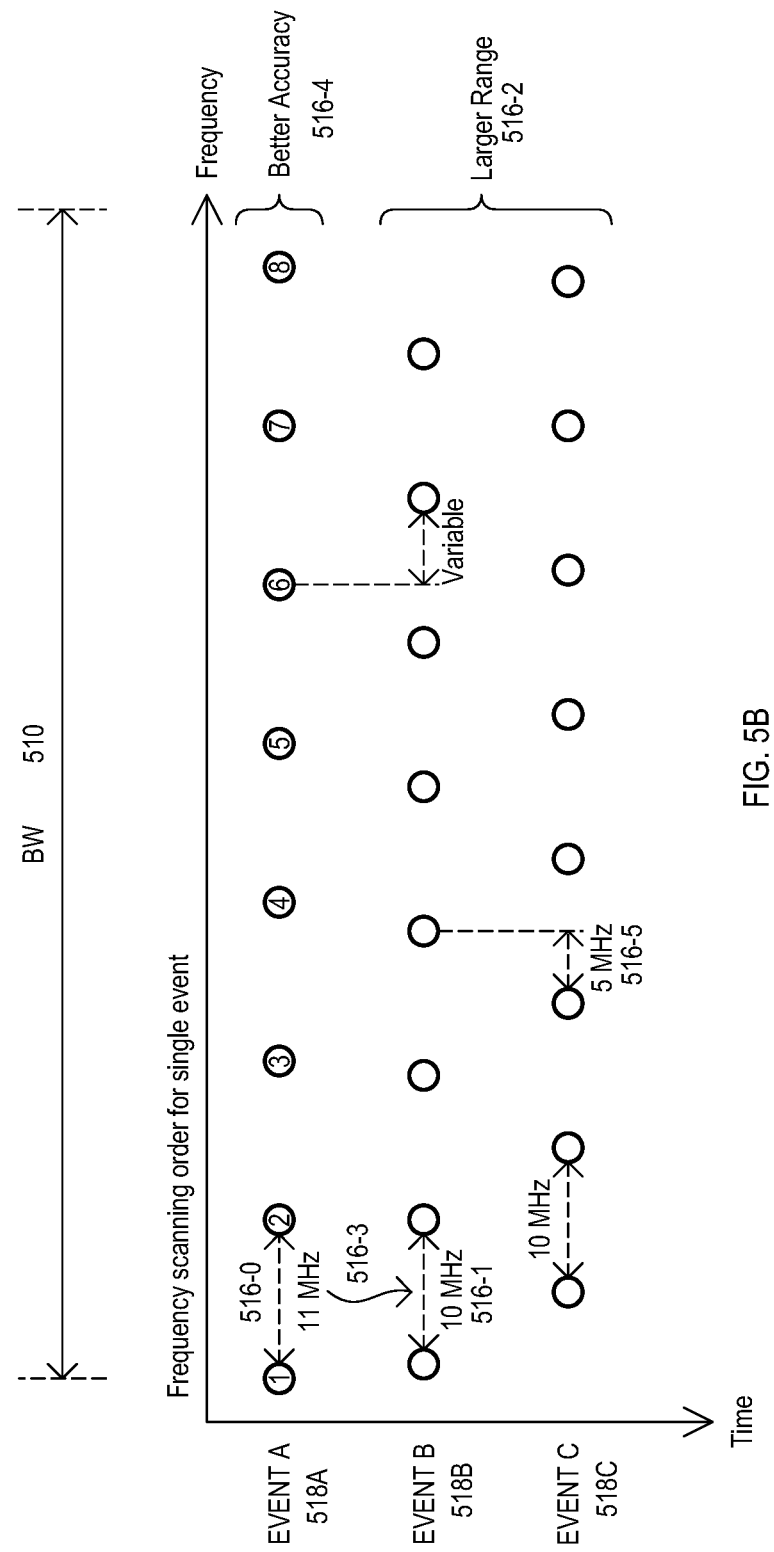
FIG. 5B is a diagram showing sample sets for distance estimation events derived with the factors shown in FIG. 5A.

FIG. 5B is a diagram showing sample sets for events according to embodiments. FIG. 5B is a graph showing a frequency scanning order (x-axis) for various events in time (y-axis). In the embodiment shown, a bandwidth 510 can be about 80 MHZ, and a minimum frequency step can be 1 MHz. Further, a maximum number of frequencies that can be sampled in a single event can be eight. However, this should not be construed as limiting. The features of FIG. 5B could be employed in any other suitable system by one skilled in the art.

A first event 518A shows how a frequency step 516-0 can be selected to span a BW 510. Further, by including a largest frequency step (11 MHZ), event 518A can have a better accuracy 516-4. That is, larger frequency steps correspond to greater accuracy.

A second event 518B shows how a largest frequency step 516-1 can be a multiple of two (10 MHZ), while at the same time maximizing BW coverage for an even numbered frequency step. A second event 518B also shows how a frequency step between events (518A and 518B) can be a minimum amount, with event 518A having a 11 MHz spacing and following event 518B having a 10 MHz spacing.

A third event 518C shows how there can be a uniform frequency step (5 MHZ) 516-5 between events 518B/C having a same frequency step. Second and third events 518B/C show how decreasing a uniform frequency step can enable larger range estimation 516-2 than the previous (e.g., larger frequency step) event 518A.

While FIG. 5B shows scanning of frequencies in a particular order, alternate embodiments can include any of the scanning orders noted herein (descending, random/pseudorandom). Further, as noted herein, alternate embodiments can include fewer or greater numbers of scanning frequencies.

In some embodiments, FIG. 5B shows operations of a BT system having a 78 MHz bandwidth of 1 MHz channels, or a BLE system having 2 MHz channels.

While the embodiment of FIG. 5B shows an arrangement that generates eight tones over BW 510, alternate embodiments can include a larger number of tones (e.g., those operating over a larger bandwidth, capable of processing tones faster and/or having a larger time window to work with), or a smaller number of tones.

Figure 6A:
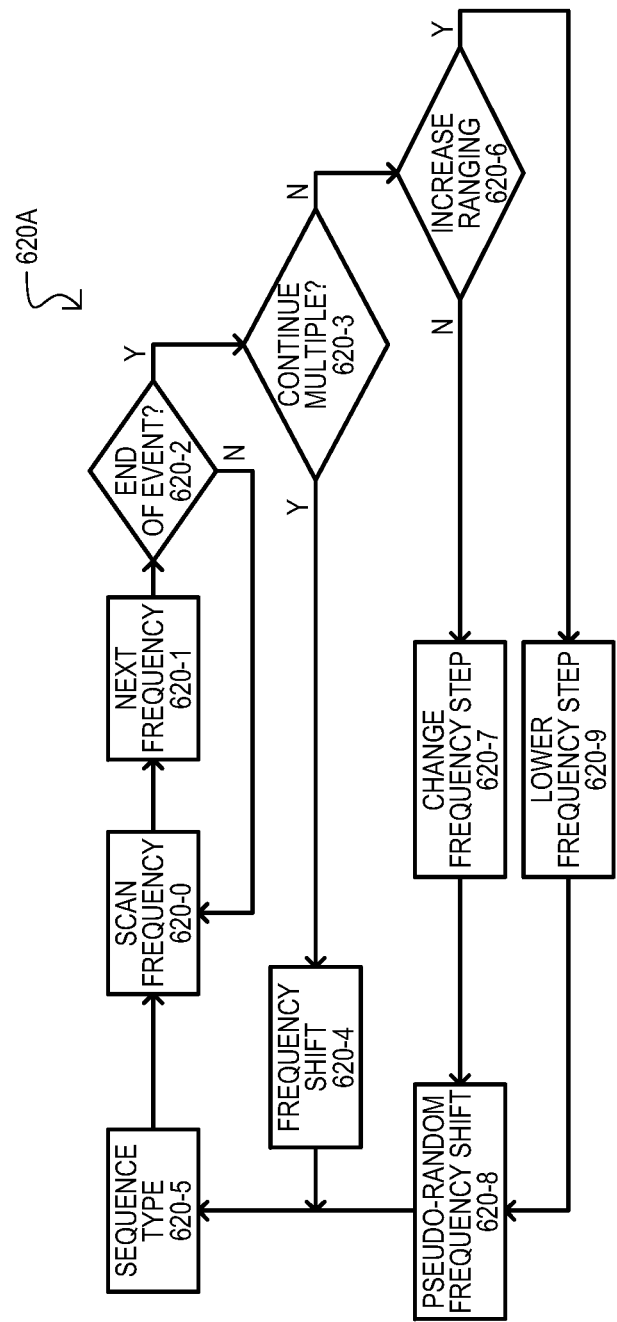
FIG. 6A is a flow diagram showing a distance estimation method using wireless signals transmitted at equal frequency steps according to an embodiment.

FIG. 6A is a flow diagram of a method 620A according to an embodiment. A method 620A can generate sample sets of tones having uniform separation with respect to frequency for use in a distance estimation application. Further, such sample sets can be dynamically adjusted based on distance estimation results.

A method 620A can include scanning a frequency 620-0. In some embodiments, such an action can include transmitting and/or receiving on one a tone of a sample set. Further, phase measurements can be made on received tones. A frequency can be changed to a next frequency according to the sample set 620-1. In the embodiment shown, this can include increasing or decreasing a frequency by a uniform step amount. While the event continues (N from 620-2), a method 620A can continue with a next scan frequency.

When an event has ended (Y from 620-2), a method 620A can determine whether to continue with a current frequency step (which can be a multiple of a number) 620-3. In some embodiments, such an action can depend upon sensing results, or an operating environment. If operations are to continue with the current frequency step value (Y from 620-3), a method 620A can shift a frequency to arrive at a next sample set 620-4. After the frequency shift 620-4, a next sequence (i.e., sample set) can be established 620-5. In some embodiments, this can include establishing whether the sequence will be an increasing or decreasing sequence. A method 620A can then continue with the next sample set (go to 620-0).

If operations are not to continue with a current frequency step (N from 620-3), a method 620A can determine if increased ranging is needed 620-6. Such an action can include analyzing results (e.g., phase differences) from previous sample sets to determine an estimated range and/or considering distance estimation results from some other calculation or system (e.g., round trip time, RTT). If increased ranging is determined to not be needed (N from 620-6), frequency step can be changed 620-7. A pseudo-random frequency shift can then take place 620-8. A method 620A can then continue with a next sequence (go to 620-5).

If increased ranging is determined to be needed (Y from 620-6), frequency step can be lowered 620-9. A pseudo-random frequency shift can then take place and a method can then continue to a next sequence (620-5/8).

An embodiment like that of FIG. 6A, that provides for smooth increase or decrease in frequency for sample sets can advantageously decrease noise between neighboring frequencies. This can be preferable for some phase measuring distance estimation algorithms, such as multiple signal classification (MUSIC) algorithms, including "Smooth-MUSIC" type algorithms.

Figure 6B:
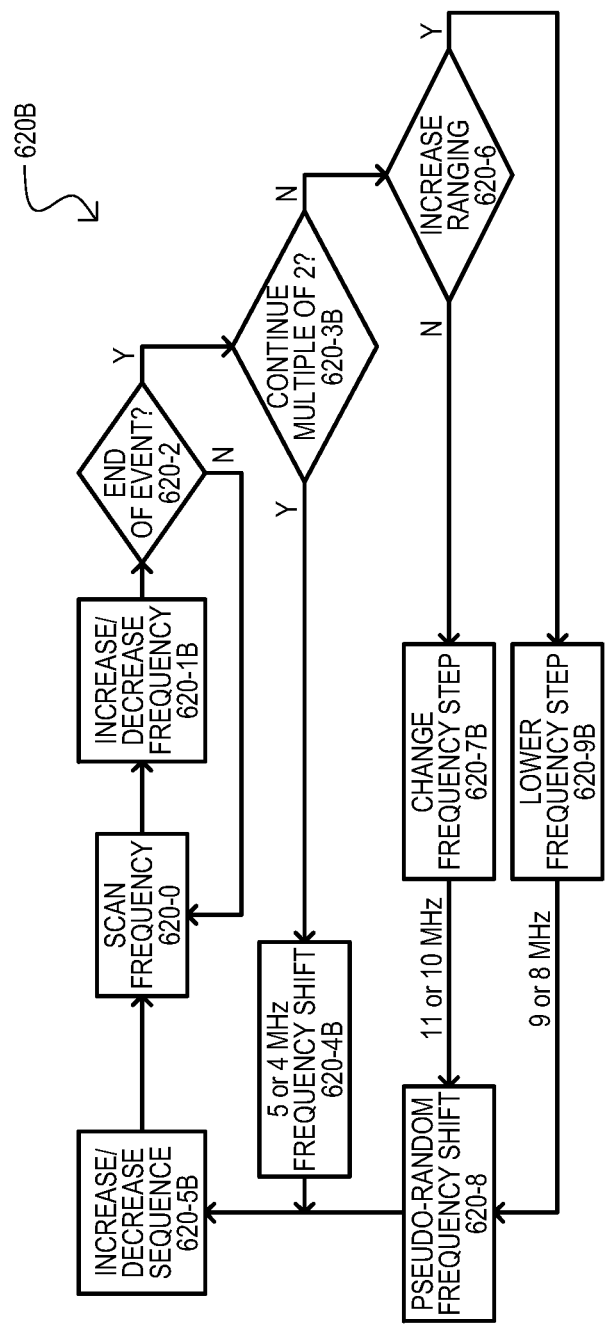
FIG. 6B is a flow diagram showing a distance estimation method that can be included in systems compatible with a Bluetooth (BT) standard.

FIG. 6B is a flow diagram of a method 620B according to another embodiment. A method 620B can include actions like those described in FIG. 6A, and such like actions are referred to with the same reference character. In some embodiments, a method 620B can performed by a BT compatible device that is optimized to process eight tones in an event. Accordingly, in FIG. 6B, increases or decreases in frequency (620-1B) can be along steps established by tones generated according to BT standards. For example, a method 620B can be compatible a BT standard and generate unmodulated tones. In such an embodiment, generated tones can be along 2 MHz channel center frequencies, offset higher by about 250 KHz.

Continuing or not continuing (620-3B) can be for frequency steps that are a multiple of two (e.g., 10 MHZ, 8 MHZ). As a result, a frequency shift step 620-4B can be 5 MHz (for 10 MHz steps) or 4 MHZ (for 8 MHz step). Further, changing a frequency step (not for increased ranging) 620-7B can result in the selection of 10 MHz or 11 MHz steps, for increasing an accuracy of a distance estimation. Changing a frequency step for increased ranging 620-9B can result in the selection of 9 MHz or 8 MHz steps. Such selections provide minimal change in frequency with respect to other (10 MHZ, 11 MHZ) steps, while still covering a large portion of the BT bandwidth. Otherwise, method 620B can operate like that shown in FIG. 6A, or in an equivalent fashion.

Embodiments like that of FIGS. 6A and 6B can provide frequency selections that make good use of an entire bandwidth and lower noise for neighboring frequencies. Further, security can be provided with a random/pseudo-random shift in frequency (620-8). However, it may be desirable to have even greater security features in a method. Such increased security can be accomplished with the inclusion of one or more additional random (or pseudo-random) actions.

Figure 6C:
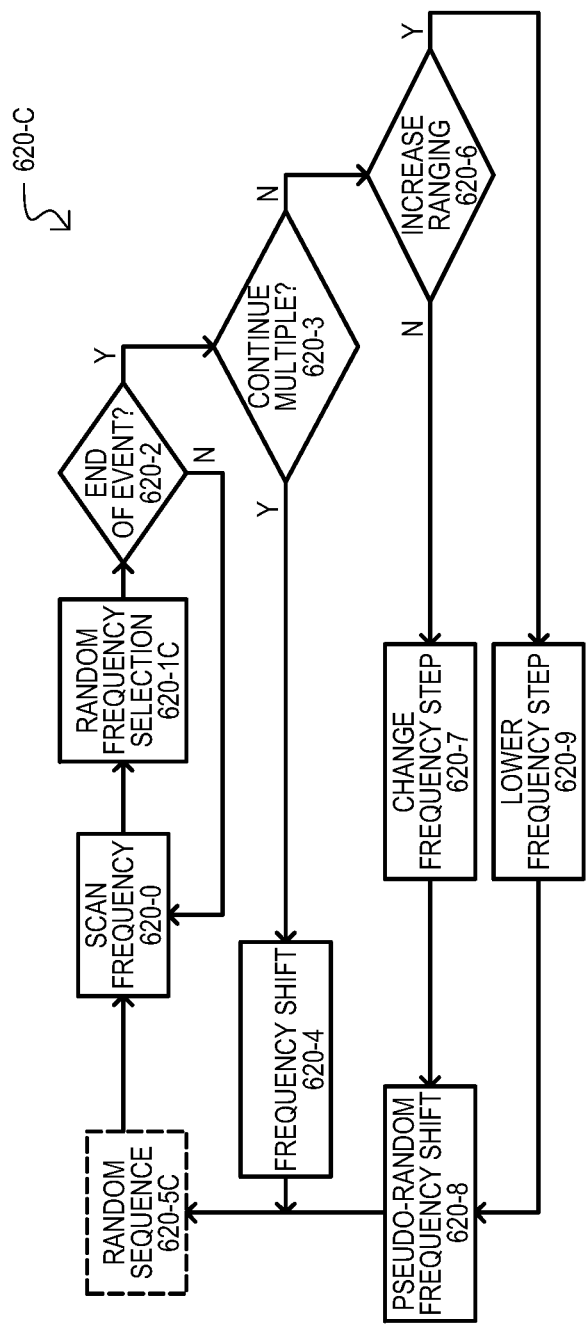
FIG. 6C is a flow diagram showing a distance estimation method using wireless signals transmitted at equal frequency steps that includes additional randomization for increased security according to an embodiment.

FIG. 6C shows a method 620C like that of FIG. 6A, but with additional randomization for greater security. Unlike FIG. 6A, frequencies for an event (e.g., frequencies of a sample set) can be selected randomly (or pseudo-randomly) 620-1C. Sequence types can be random sequences 620-5C, and/or a method 620C can randomly select between frequency selection processes (e.g., select between ascending, descending and/or random). Otherwise, method 620C can operate like that shown in FIG. 6A, or in an equivalent fashion.

Figure 7:
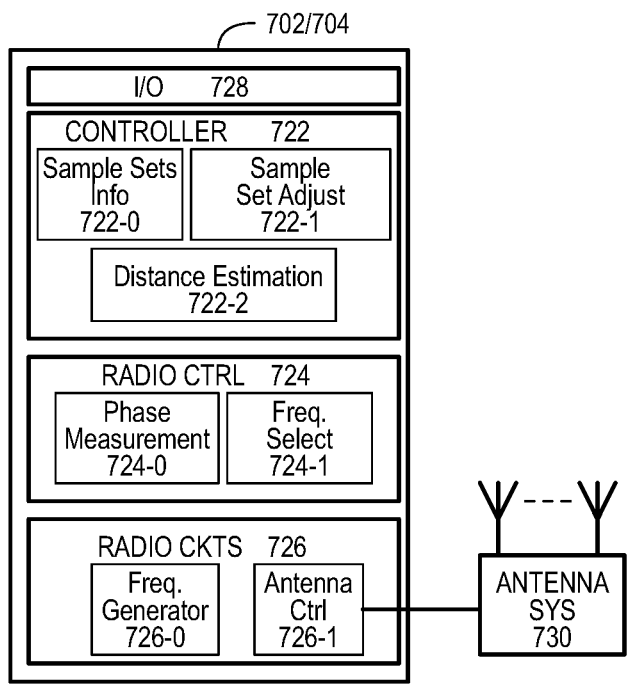
FIG. 7 is a block diagram of a device configured for wireless distance estimation according to an embodiment.

FIG. 7 is a block diagram of an initiator and/or return device 702/704 according to embodiments. A device 702/704 can include a controller section 722, a radio control circuit 724, radio circuits 726, and input/output (IO) circuits 728. A controller section 722 can include circuits for controlling wireless operations of a device 702/704. Such circuits can include, but are not limited to, one or more processors with corresponding memory, custom logic, programmable logic, or combinations thereof. In some embodiments, a controller section 722 can include sample sets 722-0, set adjusting procedures 722-1, and distance estimation procedures 722-2. Sample sets information 722-0 can include information for generating sample sets. Such information can include, but is not limited to, data for sample sets and/or algorithms for generating sample sets. Sample sets can include tones having uniform separation from one another, as described herein and equivalents.

Set adjusting procedures 722-1 can alter sample sets according to predetermined conditions, as described herein and equivalents. In an initiator device 702, distance estimation 722-2 can estimate a distance to a located device. Distance estimation can include any suitable algorithm, including but not limited to MUSIC-type algorithms, including the Smooth-MUSIC algorithm.

Radio control circuits 724 can include phase measurement circuits 724-0 and frequency selector 724-1. Phase measurement circuits 724-0 can make phase measurements on received signals. In some embodiments, this can include measuring a phase difference between frequencies of a local oscillator and those of a received signal. Frequency selector 724-1 can select frequencies for transmission.

Radio circuits 726 can include a frequency generator 726-0 and antenna control 726-1. Frequency generator 726-0 can generate radio signals at selected frequencies. Antenna control 726-1 can control access to antennas, including switching between antennas. Radio control circuits 724 can operate according to any suitable wireless standard or protocol that can generate multiple signals for phase measurement.

IO circuits 728 can enable control of device 702/704 from sources external to the device 702/704. I/O circuits 728 can enable communication with the combination device 702/704 according to any suitable fashion. In some embodiments, IO circuits 728 can include serial communication circuits, including but not limited to: serial digital interface (SDI), universal serial bus (USB), universal asynchronous receiver transmitter (UART), I²C, or I²S.

An initiator/return device 702/704 can be connected to an antenna system 730. An antenna system 730 can include one or more antennas for transmitting and receiving wireless signals, as well as switches for enabling and disabling connections to such antennas.

While embodiments can include devices that operate according to any suitable wireless standard, embodiments can be beneficial when providing advantageous distance estimation using existing wireless standards. One such standard can be a BT standard.

Figure 8A:
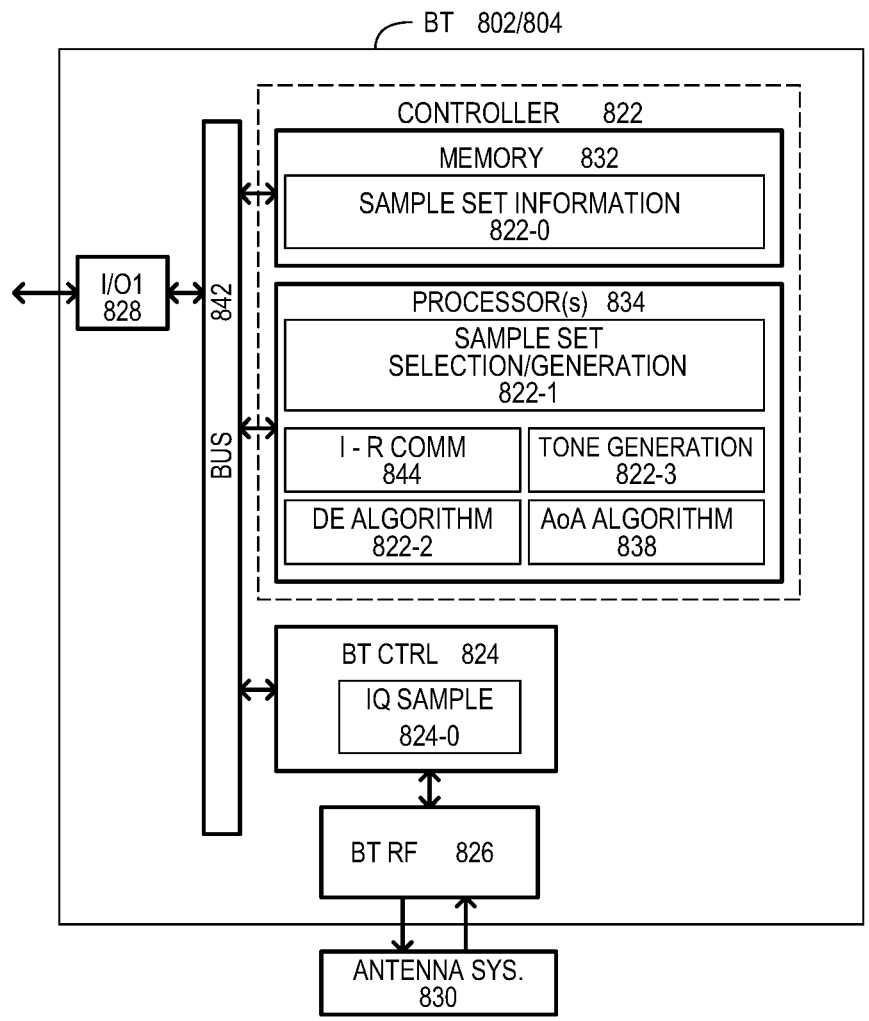
FIG. 8A is a block diagram of a BT compatible device configured for wireless distance estimation according to an embodiment.

FIG. 8A shows BT devices according to embodiments. A BT device can be an initiator device 802 or a reflector (located) device 804. BT device 802/804 can include a controller section 822, BT control circuit 824, BT RF circuit 826, 10 circuits 828 connected to one another with a bus 842. A controller section 822 can include a memory subsystem 832 and processor subsystem 834. A memory subsystem 832 can include any suitable memory circuit types, including nonvolatile and/or volatile 10) memory. A memory subsystem 832 can store any suitable data for the operation of the device 802/804, including instructions executable by processor subsystem 834. Such instructions can correspond to methods described herein, and equivalents. A memory subsystem 822-0 can include sample set information 822-0, as described herein and equivalents.

A processor subsystem 834 can include one or more processors configured to execute instructions for various operations of the device. Such operations can include, but are not limited to, sample set selection/generation 822-1, initiator-responder (I-R) communications 844, tone generation 822-3, a distance estimation (DE) 822-2, and AoA algorithm 838. Sample set selection/generation 822-1 can generate tones according to embodiments herein, including, but not limited to, tones separated by a uniform frequency amount, tones selected to maximize use of a BT bandwidth, and adjusting frequencies for changes in ranging.

In an initiator device 802, I-R communications 844 can include a device 802 transmitting one or more packets to a responder device that include sample set information 822-0. In a responder device 804, I-R communications 844 can include a device 804 receiving packet(s) that includes sample set information 822-0. This can enable a responder device 804 to know which sample sets will be used.

In some embodiments, tone generation 822-3 can provide control signals that cause BT control circuit 824 to generate unmodulated tones at the desired frequency for a sample set. In other embodiments, tone generation 822-3 can generate data for CTEs to be appended to BT packets (e.g., BLE packets) to generate desired tones. CTEs can be CTEs compatible with the BT standard or "custom" CTEs configured to generate a desired waveform when transmitted in a BT packet.

A DE algorithm 822-2 can be included in an initiator device 802, and can generate a distance estimation value from phase difference values derived from tones received by the device, and tones transmitted and received by another device. In some embodiments, DE algorithm 822-2 can include a MUSIC type algorithm, such as a Smooth-MUSIC algorithm, as but one of many examples. AoA algorithm 838 can be included in an initiator device 802, and can include any suitable AoA algorithm, including those indicated by a BT standard. Results from an AoA algorithm 838 in combination with a DE algorithm 822-2 can be used by a locator application to derive a location of a located device.

BT control circuits 824 can enable communications according to one or more BT standards, including BLE. BT control circuits 824 can format and packetize data for transmission by BT circuits, as well as de-packetize received packets. According to embodiments. In the embodiment shown, a device 802/804 can include an in phase quadrature (IQ) sampling function 824-0 for generating phase measurement values on received tones. BT RF circuit 826 can include radio circuits compatible with one or more BT standards, including receiving and transmitting packets according to a BT standard. IO circuits 828 can enable communication with between device 802/804 and another device.

A device 802/804 can operate in conjunction with an antenna system 830, which can be compatible with one or more BT standards.

In some embodiments, a device 802/804 can be advantageously included in a single integrated circuit package, including being formed with a same semiconductor substrate. However, in other embodiments, some functions (e.g., DE, AoA) can be executed by another device in communication with device 802.

As noted herein, BT embodiments can generate unmodulated tones at desired frequencies for distance estimation operations. However, alternate embodiments may generate such tones with BT packets.

Figure 8B:
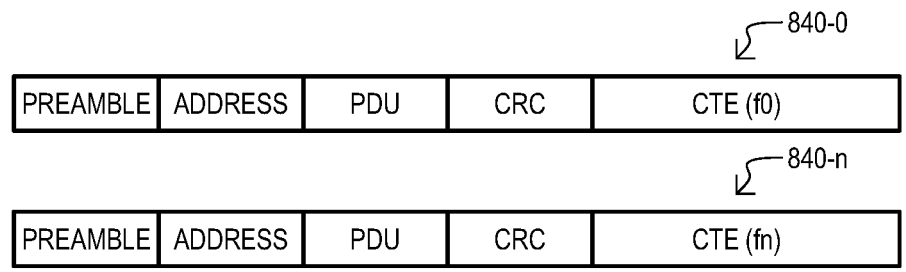
FIG. 8B is a diagram showing packets that can be transmitted and/or received by the device of FIG. 8A.

FIG. 8B is a diagram showing packets (840-0 and 840-n) that can be transmitted and received by a device 802/804 according to an embodiment. Packets (840-0 and -n) can correspond to different tones of a sample set, and can be BLE compatible packets that include a preamble, address, protocol data unit, and cyclic redundancy check (CRC). In addition, each packet (940-0/n) can include a CTE configured to generate a desired tone (f0, fn) of a sample set, as described herein or equivalents.

Figure 9A:
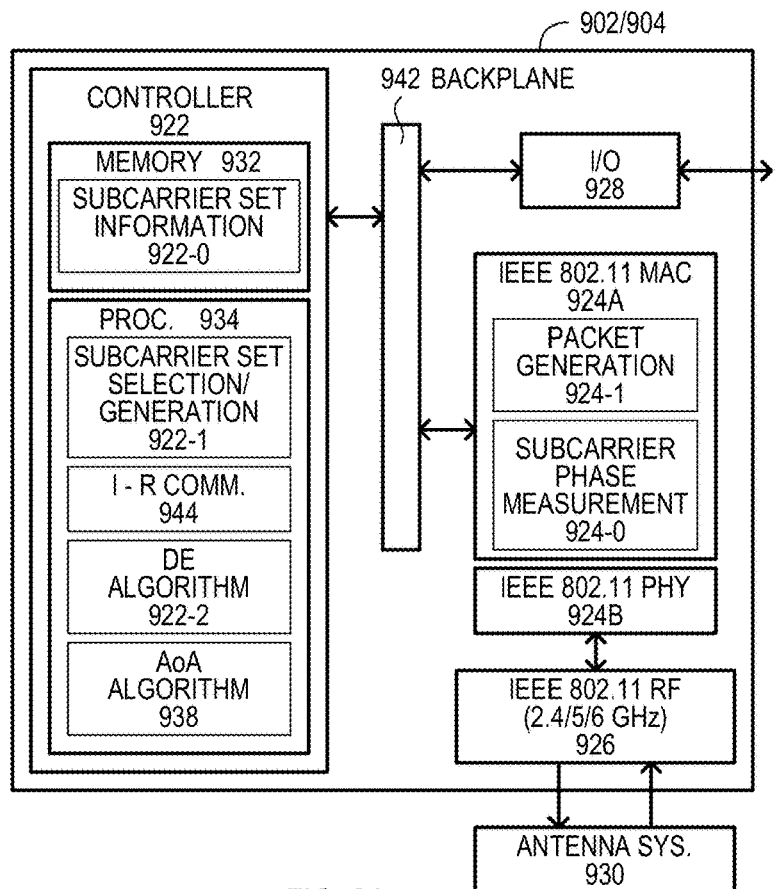
FIG. 9A is a block diagram of a device compatible with an IEEE 802.11 wireless standard configured for wireless distance estimation according to an embodiment.

FIG. 9A shows devices 902/904 according to embodiments that are compatible with one or more IEEE 802.11 wireless standards. A device 902/902 can be an initiator device 902 or a return (located) device 904. Device 902/904 can include a controller section 922, IEEE 802.11 media access control layer (MAC) circuits 924A, IEEE 802.11 physical layer (PHY) circuits 924B, IEEE 802.11 RF circuits 926, and IO circuits 928 connected to one another via a backplane 942. A controller section 922 can include a memory subsystem 932 and processor subsystem 934, which can include any suitable circuits as described herein or equivalents. In the embodiment shown, a device 802/804 can transmit signals simultaneously on multiple frequencies (e.g., subcarriers) of a channel. A memory subsystem 932 can include subcarrier set information 922-0, which can identify subcarriers separated from one another by uniform frequency steps, which can serve as tones for sample sets.

MAC circuits 924A can be compatible with one or more IEEE 802.11 wireless standards, and can include packet generation circuits 924-1 and subcarrier phase measurement circuits 924-0. Packet generation circuits 924-1 can format and packetize data frames for transmission, as well as de-frame received packets. Subcarrier phase measurement circuits 924-0 can measure a phase difference between received subcarriers signals and local signals. RF circuit 926 can include radio circuits compatible with one or more IEEE 802.11 wireless standards, and transmit and receive on any of 2.5 GHZ, 5 GHz or 6 GHz bands.

A device 902/904 can be connected to an antenna system 930 that can receive and transmit signals compatible with one or more IEEE 802.11 wireless system.

Figure 9B:
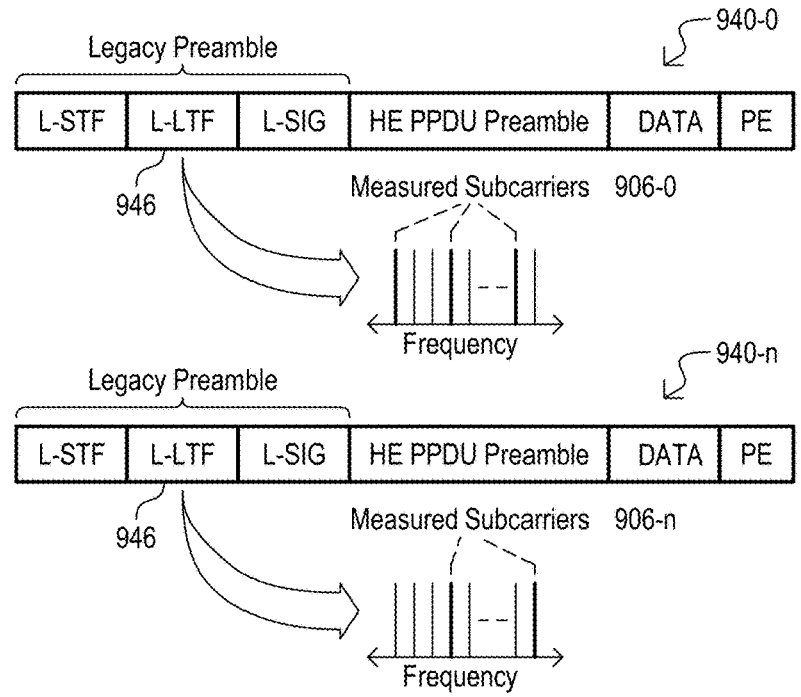
FIG. 9B is a diagram showing packets that can be transmitted and/or received by the device of FIG. 9A.

FIG. 9B is a diagram showing packets (940-0 and 940-n) that can be transmitted and received by a device 902/904 according to an embodiment. Packets (940-0 and -n) can be compatible with an IEEE wireless standard that includes an LTF 946. LTFs 946 can include multiple subcarriers transmitted at the same time. In a range sensing operation, an LTF 946 can be transmitted, and a phase measurement taken on selected subcarriers. Packet 940-0 can have one sample set of subcarriers 906-0, which can be evenly separated from one another as described herein and equivalents. Packet 940-n can have another sample set of subcarriers 906-n, whose phase shift can be evaluated.

As in the case of FIG. 8A, the embodiments shown in FIG. 9A can be advantageously compact single integrated circuits (i.e., chips).

While FIGS. 8A to 9A show two separate devices, alternate embodiments can combine such devices. Such a combination device can include compatibility with both one or more BT standards as well as one or more IEEE 802.11 wireless standards. Further, such a device can include coexistence circuits/processes that controls access to a commonly shared medium. Such coexistence circuits/processes can switch DE functions between different standards (e.g., BT and IEEE 802.11 wireless) and/or combine DE results generated by such different standards.

Embodiment can also include systems with multiple devices interacting. Systems according to some embodiments will now be described.

Figure 10:
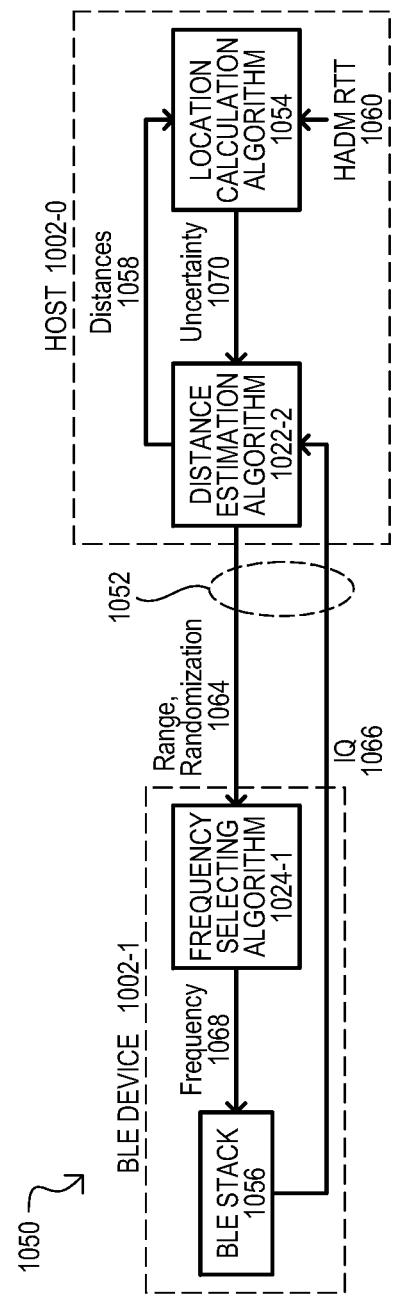
FIG. 10 is a block diagram of an initiator system for distance estimation according to an embodiment.

FIG. 10 is a block diagram of a system 1050 for locating devices according to an embodiment. A system 1050 can include a host device 1002-0 and a BLE device 1002-1 that communicate via communication path(s) 1052. Communication path(s) 1052 can include one or more wired connections (e.g., bus, intermediate devices), wireless connections, or a combination thereof.

A host device 1002-0 can include a DE algorithm 1022-2 and location calculation algorithm 1054. A DE algorithm 1022-2 can generate distance values 1058 from frequency and phase difference values. In addition, a DE algorithm 1022-2 can provide range and randomization values 1064 for use by BLE device 1002-1.

A BLE device 1002-1 can include a BLE stack 1056 and frequency selecting algorithm 1024-1. A BLE stack 1056 can include circuits and instructions for executing BLE operations. Such BLE operations can include, but are not limited to, the reception of signals in the BT spectrum as well as IQ (or phase difference and amplitude) measurements on such signals. Frequency selecting algorithm 1024-1 can select frequencies for reception and/or transmission, including adjusting such signals and/or randomizing such signals. Frequency selecting algorithm 1024-1 can provide frequency selection values 1068 to BLE stack 1056 in response to range and randomization values 1064. In some embodiments, frequencies can be generated with CTEs as described herein, or equivalents.

In operation, a location calculation algorithm 1054 can send initial range, randomization values 1064 to frequency selection algorithm 1024-1. Such values can be based on the expected range of a detected object. From range, randomization values 1064, a frequency selecting algorithm 1024-1 can provide an initial set of frequency selection value (e.g., a sample set) 1068 to BLE stack 1056. From such values, BLE stack 1056 can transmit frequency selection values (e.g., sample set information) to another (e.g., reflector) device; transmit on such frequencies, receive on such frequencies, and make IQ (or phase difference and amplitude) measurements on received frequencies; and receive IQ (or phase difference and amplitude) measurements from the other device.

A BLE stack 1056 can send IQ (or phase difference and amplitude) measurements 1066 to DE algorithm 1022-2. From such values, DE algorithm 1022-2 can generate distance values 1058 for location calculation algorithm 1054. At the same time, HADM RTT results 1060 can be provided by BLE device 1002-1 to location calculation algorithm 1054. From such values (1058, 1060), location calculation algorithm 1054 can determine possible distances to the located device, perform tracking of the device, and generate an uncertainty value 1070. From the uncertainty value 1070, DE algorithm 1022-2 can adjust a range, randomization value 1064 if needed. Uncertainty value 1070 can define a condition (e.g., 620-6 in FIG. 6C) to switch between a higher frequency step (e.g., 620-7 of FIG. 6C) to have sufficient accuracy or a lower frequency step (e.g., 620-9 of FIG. 6C) to increase ranging.

Figure 11:
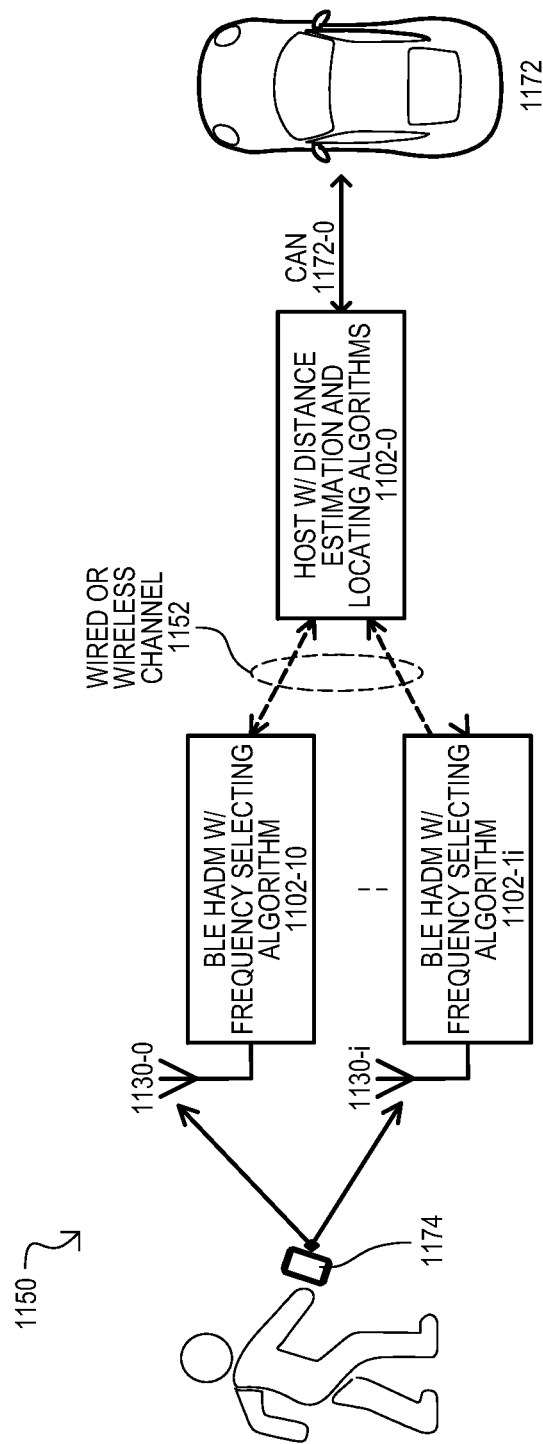
FIG. 11 is a diagram showing an automobile system according to an embodiment.

FIG. 11 is diagram of an automobile system 1150 according to an embodiment. A system 1150 can exist in an automobile 1172 that includes a communication bus 1172-0, which can be a controller area network (CAN) type bus. A host device 1102-0 can be connected to bus 1172-0, and can be in communication with multiple BLE devices 1102-10 to 1102-1i via channel(s) 1152, which can be wired and/or wireless.

BLE devices (1102-10 to -1i) can be any suitable BLE systems of the automobile 1172, and can transmit tone sample sets to, and receive tone sample sets from, device 1174, which can be a reflector (e.g., responder, located) device. Any or all BLE devices (1102-10 to -1i) can transmit sample set data to, and receive IQ (or phase difference and amplitude) measurements from located device 1174. IQ (or phase difference and amplitude) measurements can be provided to host device 1102-0 which can make distance estimation and/or location calculations based on such values. BLE devices (1102-10 to -1i) can be connected to one or more antenna systems 1130-0, 1130-i.

Reflector device 1174 can emit sample sets of tones for detection and phase evaluation by BT devices (1102-10 to -1i). Reflector device 1174 can be any suitable system for interacting with an automobile 1172, including but not limited to an electronic key/remote device and/or personal smart device.

Figure 12:
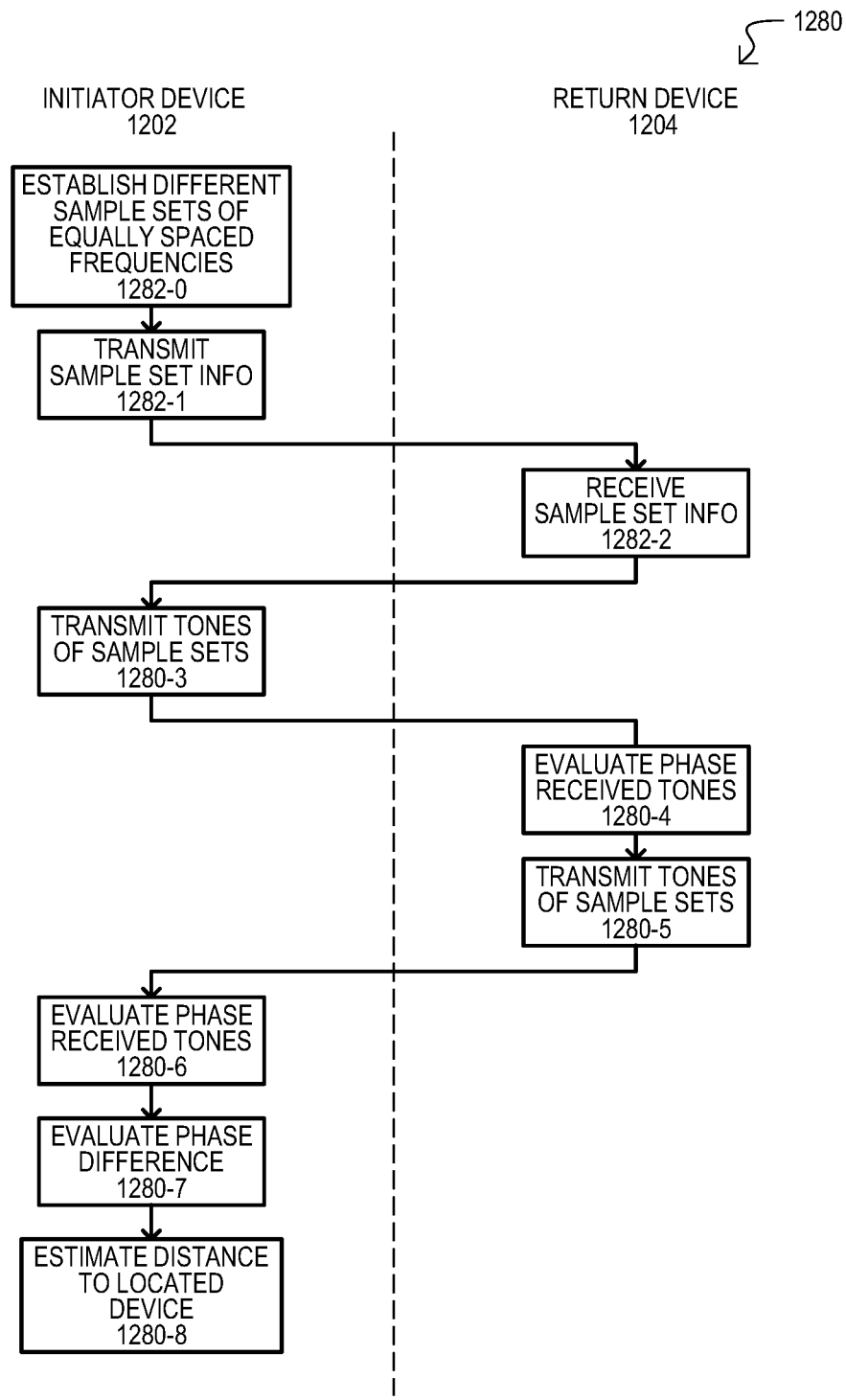
FIG. 12 is a flow diagram of a distance estimation method according to an embodiment.

While the described devices and systems have disclosed various methods according to embodiments, additional methods will be described with reference to flow diagrams. FIG. 12 is a flow diagram of a method 1280 according to an embodiment. A method 1280 can be executed by an initiator device 1202 and a return (e.g., reflector) device 1204.

A method 1280 can include an initiator device 1202 establishing different sample sets of equally spaced frequencies 1282-0. In some embodiments, such an action includes selecting a number of tones that can fit within a sample period (event time), that are equally spaced with respect to frequency, and that can maximize an available bandwidth. Information for such sample sets can be transmitted to a return device 1282-1. Such an action can include transmitting one or more packets according to a predetermined wireless protocol.

A return device 1204 can receive sample set information 1282-2. From such sample set information, a located device can determine which frequencies to monitor, and for sequential sample sets, in which order to monitor. In some embodiments, such information can enable a return device 1204 to know which frequencies to transmit on, as well. In alternate embodiments, a return device 1204 can know which frequency to transmit on based on a preceding received transmission.

An initiator device 1202 can transmit tones of a sample set 1280-3. Such an action can include transmitting tones sequentially in time or transmitting some or all such tones at the same time. Such tones can be received by a return device 1204. A return device 1204 can evaluate the phase for such received tones 1280-4.

In some embodiments, a return device 1204 can transmit tones of a sample set 1280-5 to an initiator device 1202. A phase of transmit tones in 1280-5 can be defined by evaluation of phase in 1280-4. Such actions can be subject to the same variations as 1282-1. In some embodiments, such an action can include transmitting on the same tones as received from an initiator device 1202, and in the same order, if such tones were received sequentially. If a return device 1204 transmits tones for a sample set, an initiator device 1202 can evaluate a phase for such tones 1280-6.

With phase data, an initiator device 1202 can estimate phase differences 1280-7 between transmit (1280-3) and received (1280-6) tones. With such phase differences, initiator device 1202 can estimate a distance to a return device 1280-8.

Figure 13A:
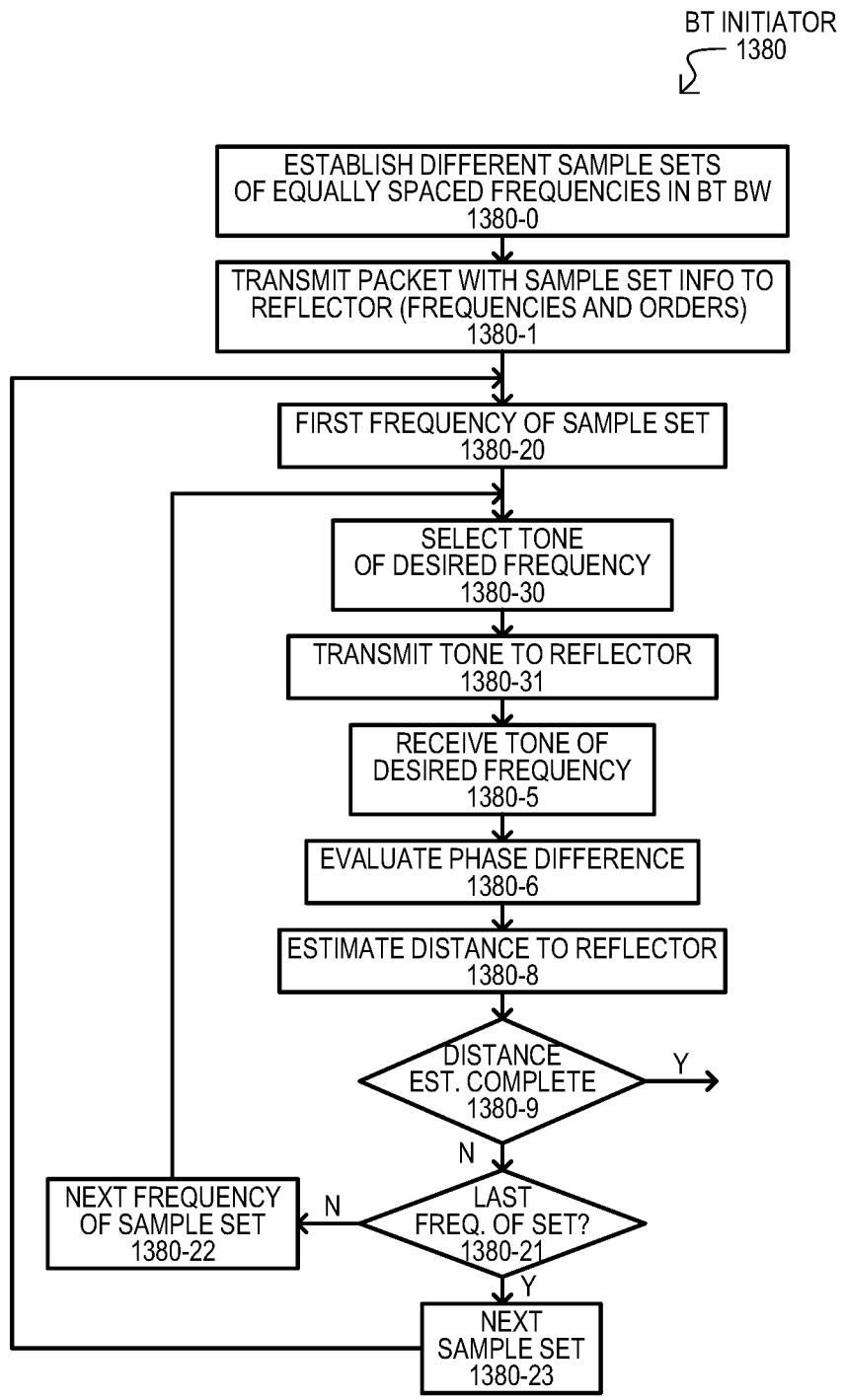
FIG. 13A is a flow diagram of a distance estimation method for a BT initiator device according to an embodiment.

FIG. 13A is a flow diagram of a method 1380 according to another embodiment. A method 1380 can be executed by an initiator BT device. A method 1380 can include establishing different sample sets of equally spaced frequencies in a BT BW 1380-0. Such an action can include establishing at least one sample set having a frequency step of 10 or 11 MHz to span essentially all of the BT BW. A packet with sample set information can be transmitted a reflector device 1380-1. Such information can enable a reflector device to know the frequencies and the order of initiator device transmissions.

A method 1380 can proceed with a first frequency of a sample set 1380-20. A tone can be selected of the desired frequency 1380-30. In some embodiments, this can include transmitting an unmodulated tone. In other embodiments, a packet can be constructed with a CTE that will generate the desired frequency. The tone can be transmitted to the reflector 1380-31. In some embodiments, this can result in a reflector device transmitting its own tone at the same frequency. This can be received by an initiator device 1380-5. An IQ sampling or other sampling process can be performed on the received tone to arrive and estimate a phase difference value 1380-6 relative to transmit tones 1308-31.

Using phase difference data, a distance estimation to the reflector can be made 1380-8.

If a distance estimation is not complete (N from 1380-9), a method 1380 can determine if a last frequency of a set has been reached 1380-21. If a last frequency has not been reached (N from 1380-21) a method 1380 can proceed to a next frequency of the sample set 1380-22.

If a last frequency of a sample set has been used (Y from 1380-21), a method 1380 can proceed to a next sample set 1380-22. In some embodiments, such an action can include selecting a next sample set based on results (e.g., ranging, accuracy). A next sample set can be evaluated, in a next event, for example. Sample sets of frequencies can continue to be evaluated until a distance estimation operation is complete (Y from 1380-9).

Figure 13B:
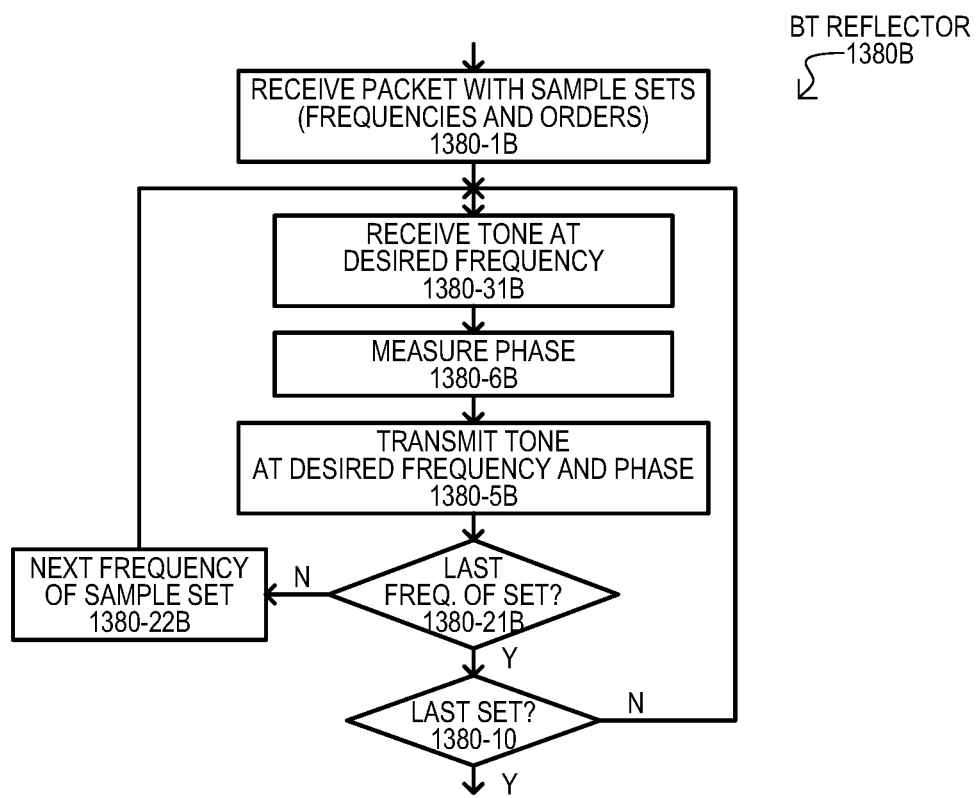
FIG. 13B is a flow diagram of a distance estimation method for a BT reflector device according to an embodiment.

FIG. 13B is a flow diagram of a method 1380B according to another embodiment. A method 1380B can be executed by a reflector BT device. A method 1380B can correspond to that of FIG. 13A.

A reflector device can receive sample set information 1380-1B. Such an action can include receiving one or more BT packets that indicate frequencies and order of tones for sample sets. Such information can be data indicating such tones, or an algorithm or algorithm setting to generate such tones.

A tone of the desired frequency can be received 1380-31B. In some embodiments, such a tone can be an unmodulated tone transmitted by an initiator device. In other embodiments, such a tone can be from a packet with a CTE that generates a tone for the sample set. A phase can be measured for the received tone. In the embodiment shown, upon receiving a tone, a method 1380B can transmit a corresponding tone with the measured phase 1380-5B for reception by the initiator device. Such operations can continue until all frequencies of a sample set have been received and transmitted (N from 1380-21B, 1380-22B).

If a last sample set has not been reached (N from 1380-10), a method 1380 can continue to process a next sample set (return to 1380-31B).

Figure 14A:
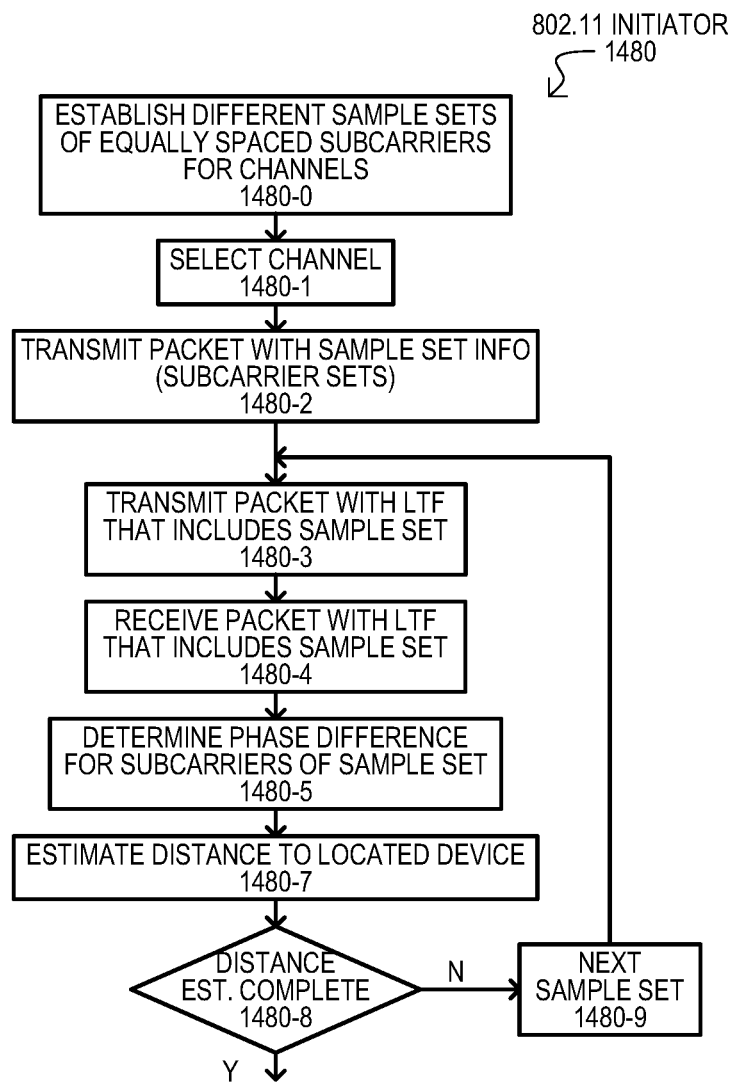
FIG. 14A is a flow diagram of a distance estimation method for an initiator device compatible with an IEEE 802.11 wireless standard according to an embodiment.

FIG. 14A is a flow diagram of a method 1480 according to another embodiment. A method 1480 can be executed by an initiator device compatible with an IEEE 802.11 wireless standard. A method 1480 can include establishing different sample sets composed of equally spaced subcarriers in channels 1480-0. Channels can include channels according to one or more IEEE 802.11 standards (e.g., 20 MHz, 40 MHZ, 80 MHZ, 160 MHZ). A method 1480 can include selecting a channel 1480-1. Such an action can include selecting one of the channels for which a sample set has been established.

A method 1480 can transmit a packet with sample set information 1480-2. Such an action can include transmitting sample set information 1480-2 for the selected channel, or for a number of possible channels. Such information can be used by another device (i.e., a return device) which can measure phases of subcarriers. A method 1480 can transmit a packet with a LTF that includes frequencies of the sample set 1480-3. Such an action can include transmitting a packet according to any IEEE 802.11 wireless standard that includes a LTF, including a legacy LTF.

A packet with LTF that includes the sample set can be received 1480-4. Such a packet can have been transmitted from a device to be located. A phase difference can be determined for the sample set subcarriers in the LTF of the received packet 1480-5. Such an action can include, but is not limited to, evaluating subcarriers sequentially over the LTF period, evaluating subcarriers simultaneously, or combinations thereof.

A distance estimation to the located device can then be made 1480-7. Such an action can use the phase difference for the subcarriers, which can be estimated as the difference of phase between a transmit sample set (1480-3) and a received sample set (1480-4).

Figure 14B:
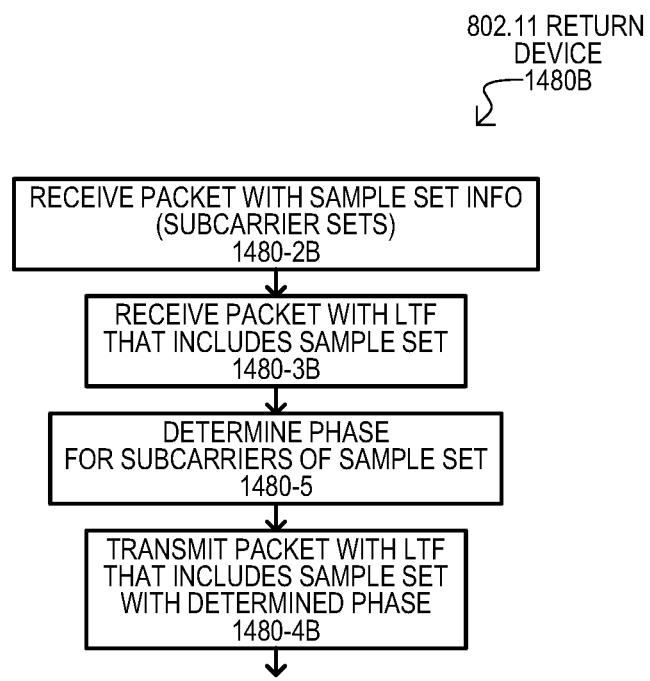
FIG. 14B is a flow diagram of a distance estimation method for a located device compatible with an IEEE 802.11 wireless standard according to an embodiment.
Figure 15:
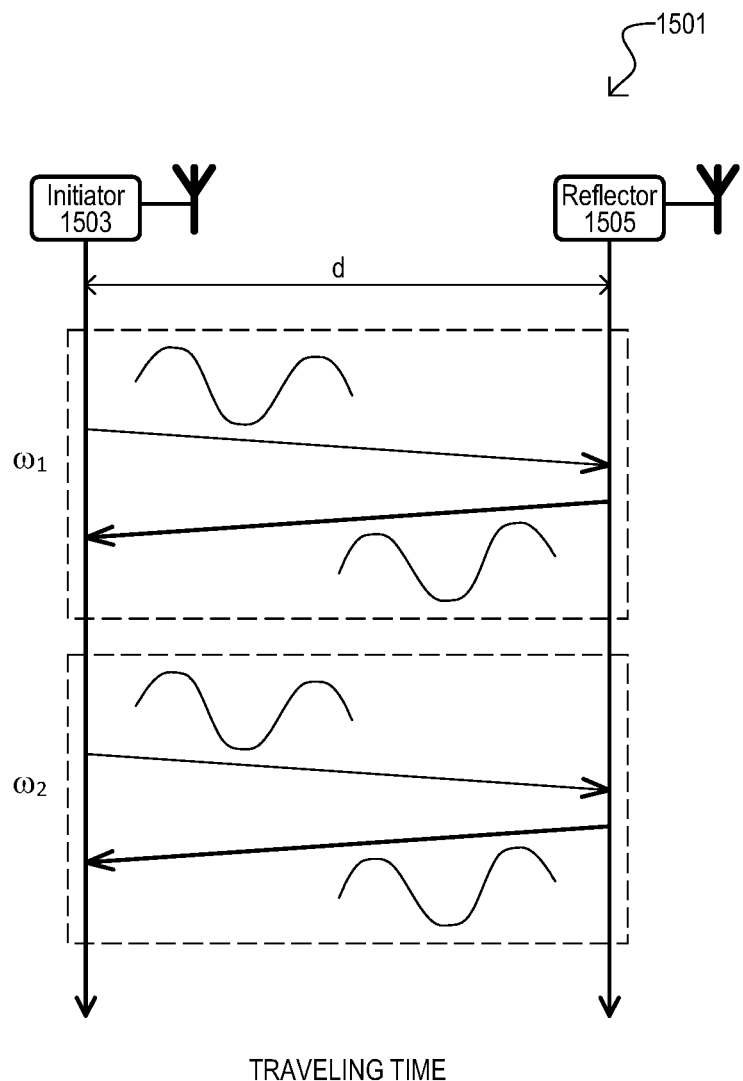
FIG. 15 is a diagram showing a conventional distance estimation approach.

If a distance estimation operation is not complete (N from 1480-8), a method 1480 can proceed to a next sample set 1480-9. In some embodiments, a next sample set can be a different set of subcarriers in the same channel selected, having equally spaced tones according to any of the embodiments herein or equivalents. FIG. 14B is a flow diagram of a method 1480B according to another embodiment. A method 1480B can be executed by a located device, and can correspond to that of FIG. 14A.

A method 1480B can include a packet being received that includes sample set information 1480-2B. Such an action can include information to identify subcarriers for phase measurement. A packet can be received with a LTF that includes a sample set 1480-3B. Phases of the subcarriers of the sample set can be determined 1480-5.

A packet can be transmitted having a LTF that includes the sample set 1480-4B. Such an action can enable an initiator device to generate phase difference values for the sub set of subcarriers.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   determining an operating range comprising a plurality of transmission frequencies;
   determining a plurality of sample sets, each sample set being different from one another and including a plurality of frequencies separated by a uniform frequency range;
   wirelessly transmitting information identifying the sample sets for at least one remote device;
   for each sample set,
      transmitting a tone on each frequency of the sample set, transmitting the tone on each frequency being different than the information identifying the sample sets,
      receiving a tone on each frequency of the sample set from another device, and
      determining phase difference values for the received tones with respect to corresponding transmitted tones; and
   generating a distance estimation value for a distance to the other device with at least the phase difference values.

2. The method of claim 1, wherein transmitting the tone on each frequency of the sample set includes transmitting tones in an ascending order with respect to frequency.

3. The method of claim 1, wherein transmitting the tone on each frequency of the sample set includes transmitting tones in a descending order with respect to frequency.

4. The method of claim 1, wherein all the sample sets are contained in a Bluetooth bandwidth that extends from 2.402 GHz to 2.480 GHz.

5. The method of claim 4, wherein:
   transmitting the tone on each frequency includes, for each transmitted tone, transmitting an unmodulated tone at the frequency; and
   determining phase difference values for the received tones includes in phase quadrature sampling.

6. The method of claim 1, wherein transmitting the tone on each frequency of a sample set includes transmitting a plurality of tones simultaneously.

7. The method of claim 1, further including, in response to the distance estimation value, selectively changing the uniform frequency range of one sample set with respect to a previous sample set.

8. A device, comprising:
   radio circuits configured to transmit
      packets according to at least one communication protocol, and
      tones on any of a plurality of consecutive frequencies contained within an operating range for the communication protocol;
   control circuits configured to
      establish a plurality of sample sets, each sample set being different from one another and including a plurality of frequencies separated from one another by a uniform frequency range,
      construct at least one packet for transmission by the radio circuits that identifies the sample sets,
      control the radio circuits to, for each sample set,
         transmit a tone on each frequency of the sample set,
         receive a tone on each frequency of the sample set from at least one other device,
      determine phase difference values for the received tones relative to transmitted tones from the other device; and
      generate a distance estimation value for a distance to the at least one other device with at least the phase difference values.

9. The device of claim 8, wherein the control circuits are configured to control the radio circuits to transmit the tone on each frequency of the sample set in an ascending order with respect to frequency.

10. The device of claim 8, wherein the control circuits are configured to control the radio circuits to transmit the tone on each frequency of the sample set in a descending order with respect to frequency.

11. The device of claim 8, wherein the control circuits are configured to control the radio circuits to simultaneously transmit a plurality of tones on their respective frequencies.

12. The device of claim 8, wherein:
   the radio circuits are compatible with at least one Bluetooth (BT) standard; and
   the control circuit is configured to, for each sample set, control the radio circuits to transmit a sequence of unmodulated tones corresponding to a different frequency of the sample set.

13. The device of claim 12, wherein the BT packets are transmitted according to a Bluetooth Low Energy standard.

14. The device of claim 8, wherein:
   the radio circuits are compatible with at least one IEEE 802.11 wireless standard; and the control circuit is configured to, for each sample set, control the radio circuits to transmit a packet with a long training field having subcarriers corresponding to each tone of the sample set.

15. The device of claim 8, wherein the control circuit is configured to, in response to the distance estimation value, selective change the uniform frequency range of one sample set with respect to a previous sample set.

16. A system, comprising:
a first device that includes circuits configured to:
determine a plurality of sample sets, each sample set being different from one another and each including a plurality of frequencies separated from one another by a uniform frequency range;
construct at least one packet for transmission that identifies the sample sets,
for each sample set,
transmit a tone on each frequency of the sample set,
receive a tone on each frequency of the sample set from a remote device,
determine phase difference values of the received tones with respect to corresponding transmitted tones; and
estimate a distance to the remote device from at least the phase difference values; and
an antenna system configured to transmit and receive over an operating frequency range that includes the frequencies of the sample sets and to transmit the at least one packet.

17. The system of claim 16, wherein:
the first device further includes circuits configured to transmit information identifying the sample sets to the remote device; and
the remote device is configured to
monitor for the sample sets,
in response to receiving tones of a sample set
determine remote phase difference values for the tones of the received sample set,
transmit a tone on each frequency of the sample set to the first device.

18. The system of claim 16, wherein the circuits of the first device are configured to, for each sample set, transmit the tone on a frequency of the sample set in a predetermined order, the predetermined order being selected from the group of: an ascending order with respect to frequency, a descending order with respect to frequency, and a random or pseudorandom order.

19. The system of claim 16, wherein:
the circuits of the first device are configured to, for each sample set,
transmit a sequence of unmodulated tones at frequencies within with a frequency range of at least one Bluetooth standard.

20. The system of claim 16, wherein the circuits of the first device are further configured to determine a direction to the remote device with transmissions received from the remote device.

* * * * *